US012324062B1

(12) United States Patent
Xie

(10) Patent No.: US 12,324,062 B1
(45) Date of Patent: Jun. 3, 2025

(54) WAX MELTING DEVICE

(71) Applicant: Lifestance Inc., Houston, TX (US)

(72) Inventor: XiuAn Xie, Guangdong (CN)

( * ) Notice: Subject to any disclaimer, the term of this patent is extended or adjusted under 35 U.S.C. 154(b) by 0 days.

(21) Appl. No.: 18/794,003

(22) Filed: Aug. 5, 2024

(51) Int. Cl.
*H05B 3/02* (2006.01)
*H05B 1/02* (2006.01)

(52) U.S. Cl.
CPC ............ *H05B 3/02* (2013.01); *H05B 1/0288* (2013.01)

(58) Field of Classification Search
CPC .......... H05B 3/02; H05B 3/06; H05B 1/0252; H05B 1/0288
See application file for complete search history.

(56) References Cited

FOREIGN PATENT DOCUMENTS

| | | | | |
|---|---|---|---|---|
| CN | 2927904 | Y | * | 8/2007 |
| CN | 202653099 | U | * | 1/2013 |

* cited by examiner

*Primary Examiner* — Hung D Nguyen

(57) ABSTRACT

The present disclosure relates to the technical field of wax melting and processing, and particularly discloses a wax melting device, including: a housing; a heating aluminum pot arranged in the housing; a spacing bracket, the spacing bracket being arranged in a cavity between the housing and the heating aluminum pot and enclosing a part of the heating aluminum pot; and at least two aluminum-pot pressing blocks, the aluminum-pot pressing blocks being arranged at different positions of the heating aluminum pot, at least one face of each of the aluminum-pot pressing blocks abutting against the heating aluminum pot, and the aluminum-pot pressing blocks being also in contact with the housing. According to the present disclosure, an operator is prevented from being scalded by the housing being continuously heated.

17 Claims, 7 Drawing Sheets

WAX MELTING DEVICE

TECHNICAL FIELD

The present disclosure belongs to the technical field of wax melting and processing, and particularly relates to a wax melting device.

BACKGROUND ART

A thermostatic wax melter is an apparatus for melting a wax, which can maintain a constant temperature such that the wax remains in a stable state during the process of melting. Such an apparatus is usually used for making candles, wax seals, wax statues and other handicrafts, and may also be used in medical, laboratory or industrial fields where wax melting is required.

The thermostatic wax melter can precisely control the temperature and maintain a constant melting temperature to ensure that the wax is processed in a suitable state so as to solve problems caused by overheating or supercooling. The wax melter can quickly melt a solid wax into a liquid state, thus improving the production efficiency and the speed of craft production. The wax melter is usually provided with a safety protection device, which can prevent a liquid wax from splashing out or causing fire and other safety problems due to an excess temperature. The wax melter can be used for different types of waxes, is suitable for making candles, wax seals, wax statues and other handicrafts, and can also be used for wax treatment in medical and laboratory fields. Generally speaking, the wax melter has the characteristics of accurate temperature control ability, a high melting speed, high safety and reliability, and the like, and can meet the processing needs of various waxes.

SUMMARY OF THE INVENTION

In view of the problems in the prior art, the present disclosure provides a wax melting device. In an aspect, a wax melting device is provided, comprising:

- a housing;
- a heating aluminum pot arranged in the housing;
- a spacing bracket, the spacing bracket being arranged in a cavity between the housing and the heating aluminum pot and enclosing at least a part of the heating aluminum pot; and
- at least two aluminum-pot pressing blocks, the aluminum-pot pressing blocks being arranged at different positions of the heating aluminum pot, at least one face of each of the aluminum-pot pressing blocks abutting against the heating aluminum pot, and the aluminum-pot pressing blocks being also in contact with the housing.

In another aspect, a wax melting device is also provided, comprising:

- a housing;
- a heating aluminum pot arranged in the housing;
- a spacing bracket, the spacing bracket being arranged in a cavity between the housing and the heating aluminum pot and enclosing a part of the heating aluminum pot; and
- a fixing bracket, the fixing bracket being arranged inside the housing, located at a lower end of the spacing bracket and connected to a bottom of the spacing bracket.

LIST OF REFERENCE SIGNS

Figure 1:
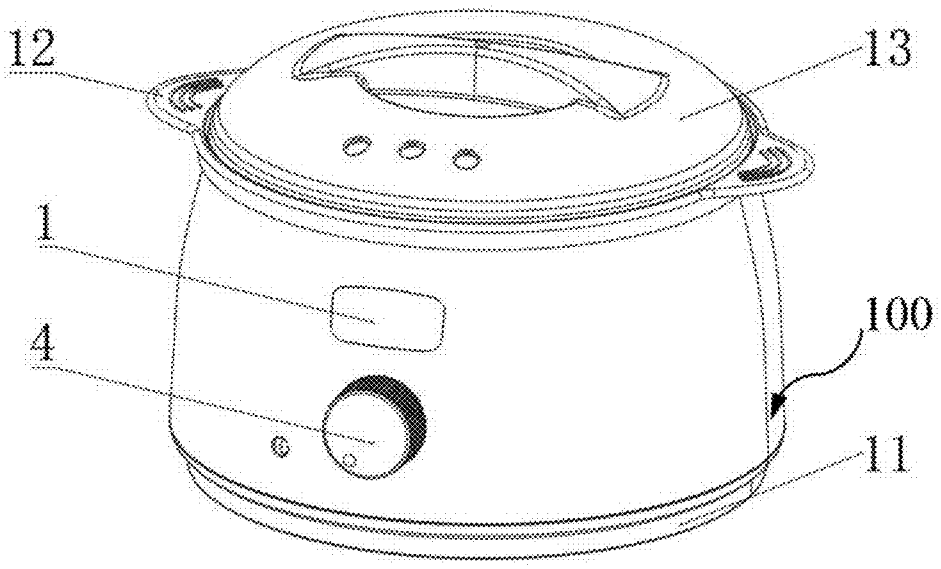
FIG. 1 is a structural perspective schematic diagram of a wax melting device according to an embodiment of the present disclosure.
Figure 2:
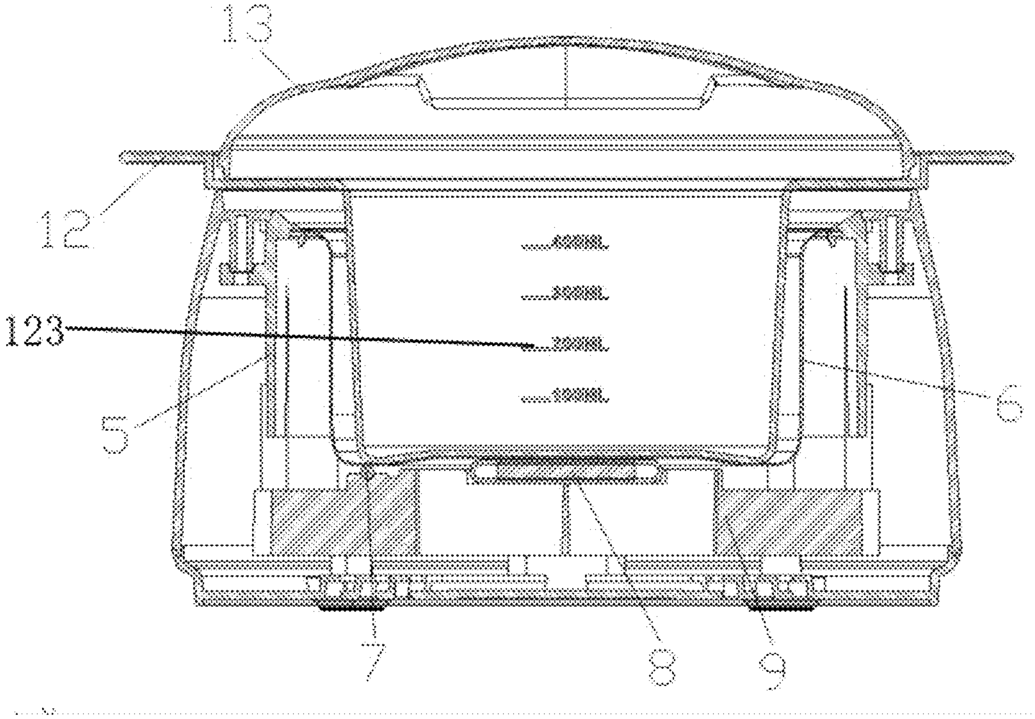
FIG. 2 is a front sectional view of the wax melting device according to an embodiment of the present disclosure.
Figure 3:
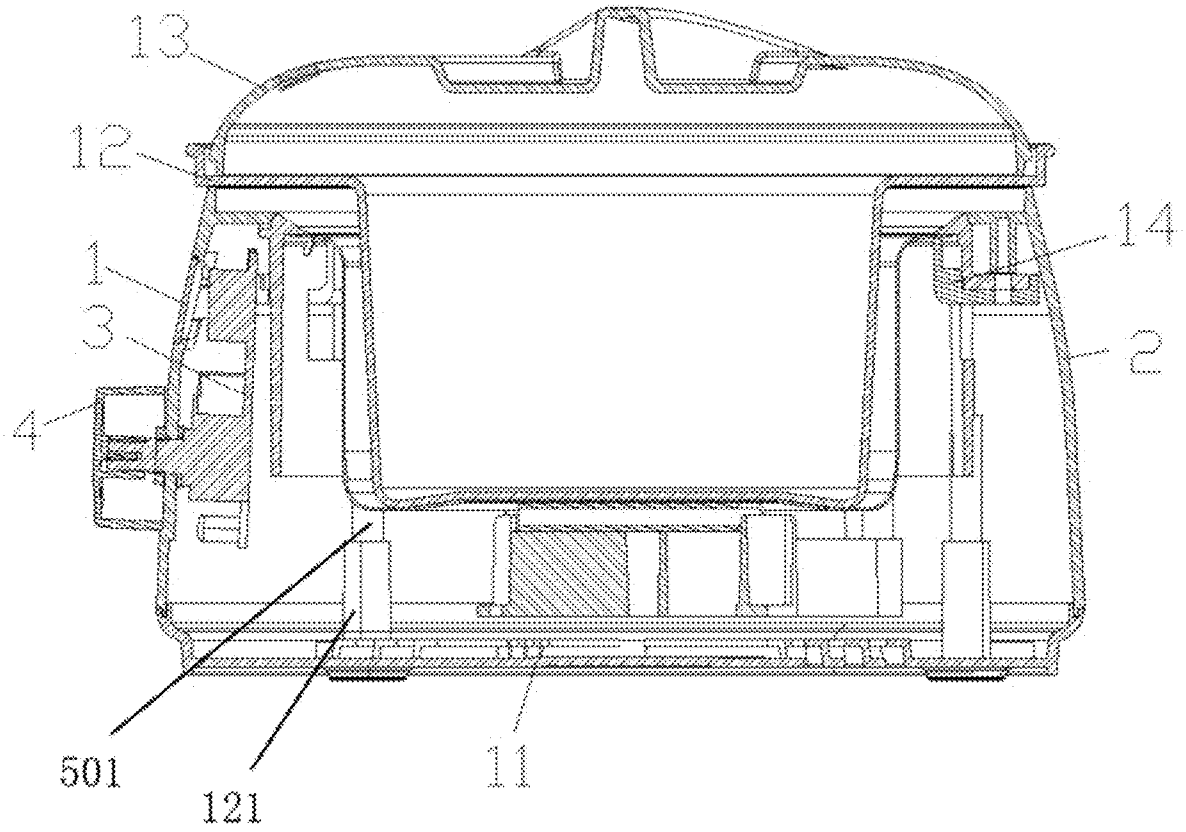
FIG. 3 is a right sectional view of the wax melting device according to an embodiment of the present disclosure.
Figure 4:
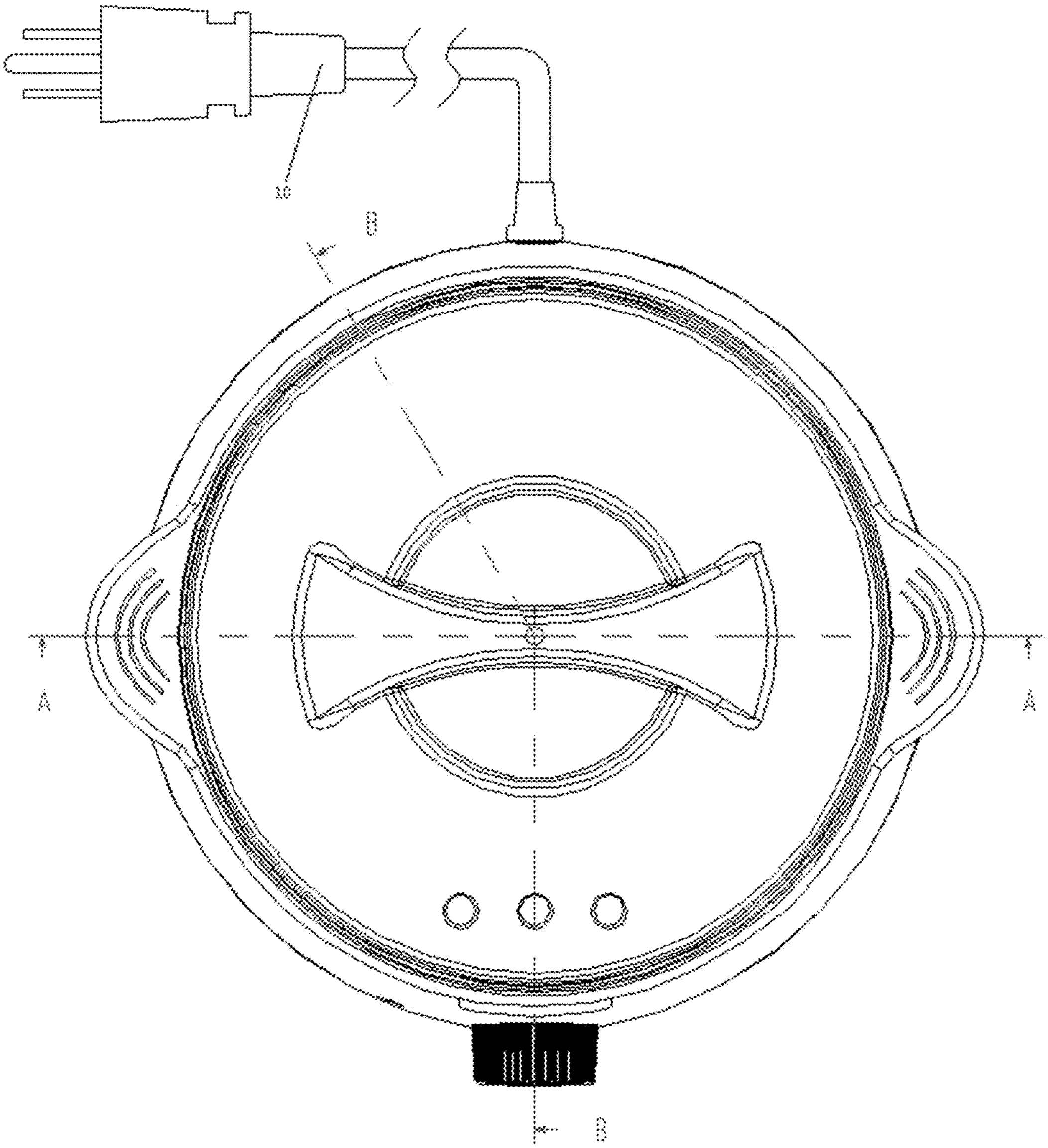
FIG. 4 is a top view of the wax melting device according to an embodiment of the present disclosure.

1. viewing window; 2. upper shell; 3. electronic control circuit board; 4. knob; 301. switch torsion bar; 302. digital display screen; 5. spacing bracket; 6. heating aluminum pot; 7. temperature sensing probe; 8. PTC heating sheet; 9. fixing bracket; 10. power cord; 11. lower shell; 12. wax melting silicone bowl; 13. top cover; 14. aluminum-pot pressing block; 100. housing; 121. bowl rim; 122. hand-held member; 123. scale line; 131. handle; 303. control panel; 121. locating column; 501. bolt column; 901. groove; 902. locating slot.

DESCRIPTION OF THE PREFERRED EMBODIMENTS

The structure of the present disclosure will be described in detail with reference to the accompanying drawings. During long-term use of a wax melter in the prior art, a high temperature produced by a heating assembly may directly bake a circuit board and a housing of the wax melter, which easily leads to premature aging or desoldering of electronic components on the circuit board; and continuously heating the housing of the wax melter may also lead to an excess temperature, resulting in a risk of scalding a user. In addition, the heating assembly and a temperature sensing assembly in the current wax melter are mounted in such a way of being attached to a pot body inside the wax melter by using a tinfoil tape. However, it is difficult to unify positions of the heating assembly and the temperature sensing assembly mounted in this way, the temperatures monitored at different positions are different, and the tinfoil tape may easily cause the heating assembly and the temperature sensing assembly to be in poor contact with the pot body, which in turn leads to a great temperature difference during use of the product. Generally, the pot body is fixed in such a way that the heating assembly is supported and propped against a bottom of the pot body by means of a support frame. This mounting method is prone to not only deforming the pot body, which in turn leads to a poor heat conduction effect of the pot body, but also loosening the pot body and producing defective products during the process of production.

In order to solve at least one of the above technical problems, as shown in FIGS. 1 to 7, an embodiment of the present disclosure provides a wax melting device, including a housing 100, a spacing bracket 5, a heating aluminum pot 6, aluminum-pot pressing blocks 14, a temperature sensing probe 7, a PTC heating sheet 8 and a fixing bracket 9. The spacing bracket 5 is arranged in a cavity between the housing 100 and the heating aluminum pot 6. The fixing bracket 9 is arranged inside the housing 100, located at a lower end of the spacing bracket 5 and connected to a bottom of the spacing bracket 5. The aluminum-pot pressing blocks 14 are arranged around the heating aluminum pot 6. At least one face of each of the aluminum-pot pressing blocks 14 abuts against the heating aluminum pot 6. The aluminum-pot pressing block 14 is also in contact with the housing 100, with a preferred mode of connection being a fixed connection. As a preferred embodiment, the aluminum-pot pressing blocks 14 are propped against an edge of the heating aluminum pot 6.

Optionally, the fixing bracket 9 is provided with a groove 901 for mounting the temperature sensing probe 7 and a locating slot 902 for placing the PTC heating sheet 8. The fixing bracket 9 is arranged at a bottom of the heating aluminum pot 6. The temperature sensing probe 7 and the PTC heating sheet 8 are arranged between the fixing bracket 9 and the heating aluminum pot 6 and are in direct contact with the heating aluminum pot 6.

As an optional embodiment, the spacing bracket 5 is fixedly mounted inside the upper shell 2 by means of a bolt, the heating aluminum pot 6 is mounted inside the spacing bracket 5, the aluminum-pot pressing blocks 14 are arranged around the heating aluminum pot 6, and a side of each of the aluminum-pot pressing blocks 14 abuts against an edge of the heating aluminum pot 6.

As an optional embodiment, the temperature sensing probe 7 is arranged in the groove 901 at a top of the fixing bracket 9, and the groove 901 is preferably a U-shaped groove. The PTC heating sheet 8 is arranged in the locating slot 902 at the top of the fixing bracket 9. The fixing bracket 9 is fixedly mounted at a bottom of the spacing bracket 5 by means of a bolt. The temperature sensing probe 7 and the PTC heating sheet 8 abut against the bottom of the heating aluminum pot 6 by means of the fixing bracket 9. A viewing window 1 is arranged at an upper portion of an outer surface of the upper shell 2. A front side of an inner chamber of the upper shell 2 is provided with an electronic control circuit board 3. The electronic control circuit board 3 includes a switch torsion bar 301 and a digital display screen 302. The digital display screen 302 is fixedly mounted at a top of the electronic control circuit board 3. The switch torsion bar 301 is fixedly mounted at a bottom of the electronic control circuit board 3. The switch torsion bar 301 passes through a switch hole on the front side of the upper shell 2 and extends to the outside of the upper shell 2. The electronic control circuit board 3 is fixedly mounted on an inner wall of the upper shell 2 by means of a bolt. A knob 4 sleeves the outside of the switch torsion bar 301. A rear side of the viewing window 1 is horizontally aligned with a front side of the digital display screen 302.

Figure 5:
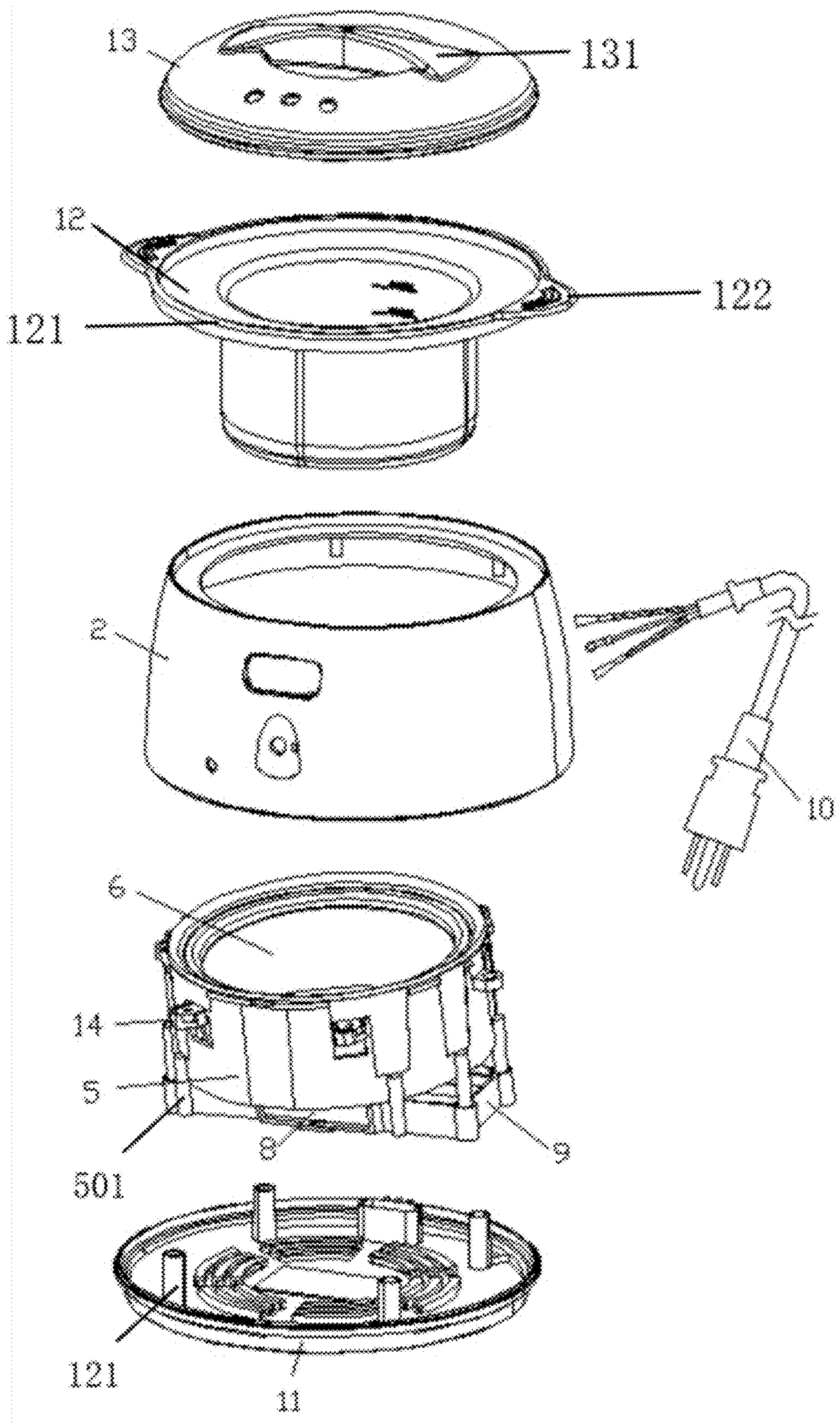
FIG. 5 is an exploded view of the wax melting device according to an embodiment of the present disclosure.

Referring to FIG. 5, in an embodiment of the present disclosure, the wax melting device may further include: a wax melting silicone bowl 12, the wax melting silicone bowl 12 being arranged on an inner side of the heating aluminum pot 6, a bowl rim 121 being provided at an upper end of the wax melting silicone bowl 12, and a hand-held member 122 being provided at a side edge of the bowl rim 121. The wax melting silicone bowl 12 can be conveniently removed by means of the hand-held member 122.

Optionally, the wax melting silicone bowl 12 is movably provided at a top of an inner chamber of the heating aluminum pot 6, and an inner chamber of the wax melting silicone bowl 12 is provided with scale lines 123, which facilitates the control of the amount of a wax in use. By providing the wax melting silicone bowl 12, the cleaning process may be more convenient, and solidified wax blocks can be quickly stripped from the bowl. A top cover 13 is movably connected to a top of the wax melting silicone bowl 12, the top cover is provided with a handle 131, and a bottom surface of the top cover 13 is in contact with the inner chamber at the top of the wax melting silicone bowl 12. The top cover 13 and the wax melting silicone bowl 12 can be used together to prevent a molten wax from sputtering in a wax melting process.

In an embodiment of the present disclosure, the housing 100 may include an upper shell 2 and a lower shell 11, a viewing window 1 is formed in the upper shell 2, an electronic control circuit board 3 is arranged between the upper shell 2 and the spacing bracket 5, and the electronic control circuit board 3 is connected to the upper shell 2. A bottom of the upper shell 2 is fixedly mounted on the lower shell 11 by means of a bolt. By providing the lower shell 11, bottoms of the PTC heating sheet 8 and other related components can be supported, and the effect of protecting the PTC heating sheet 8 and other related components can also be achieved.

Figure 6:
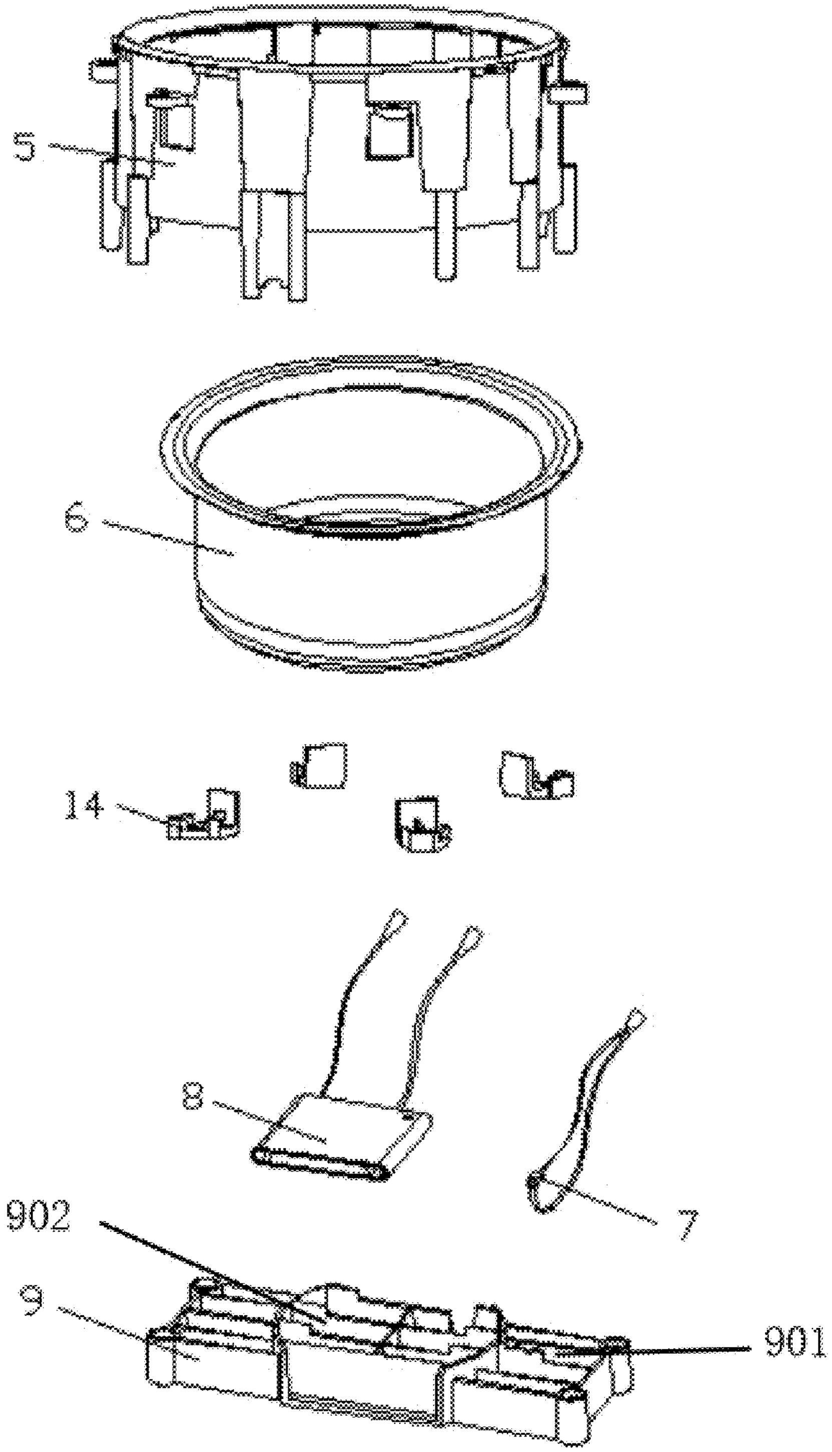
FIG. 6 is a split structural diagram of a heating mechanism according to an embodiment of the present disclosure.

Referring to FIG. 6, in an embodiment of the present disclosure, the temperature sensing probe 7 and the PTC heating sheet 8 are electrically connected to the electronic control circuit board 3 by means of wires, and the electronic control circuit board 3 is connected to a power cord 10 on a rear side of the upper shell 2. The temperature sensing probe 7 and the PTC heating sheet 8 are electrically connected to the electronic control circuit board 3 by means of wires. The temperature sensing probe 7 can monitor in real time a temperature change in the heating process of the PTC heating sheet 8 and display the temperature change by means of the digital display screen 302. The rear side of the upper shell 2 is electrically connected to the power cord 10. Positive and negative plug terminals of the power cord 10 are electrically connected to the electronic control circuit board 3. A ground terminal of the power cord 10 is electrically connected to the PTC heating sheet 8.

Figure 7:
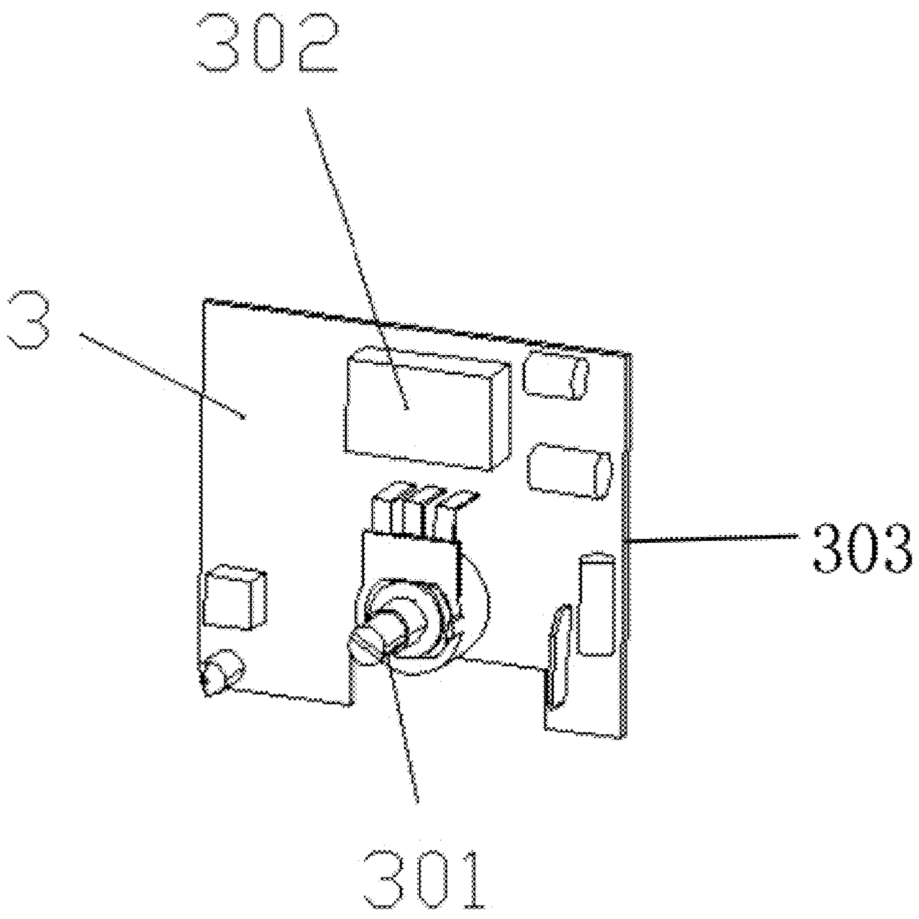
FIG. 7 is a structural diagram of an electronic control circuit board according to an embodiment of the present disclosure.

Referring to FIG. 7, the electronic control circuit board 3 includes a control panel 303, a switch torsion bar 301 and a digital display screen 302. The digital display screen 302 is connected to the control panel 303, and the digital display screen 302 is arranged inside the viewing window 1. The switch torsion bar 301 passes through the upper shell 2 and extends to the outside of the upper shell 2. A knob 4 is provided at an end portion of the switch torsion bar 301. The digital display screen 302 can display temperature data during the heating process, and the switch torsion bar 301 can adjust and control a heating temperature.

In an embodiment of the present disclosure, a locating column 121 is provided on an inner side of the lower shell 11, the spacing bracket 5 is provided with a bolt column 501, and the bolt column 501 is embedded into the locating column 121 to connect the spacing bracket 5 to the lower shell 11; and the lower shell 11 and the upper shell 2 are connected by means of a bolt. The spacing bracket 5 is of a hollow cylindrical structure, a bottom of the cylindrical structure is connected to the fixing bracket 9, an aluminum-pot pressing block 14 is provided at an upper end of the cylindrical structure, and the aluminum-pot pressing block 14 is connected to the upper shell 2 by means of a bolt.

According to the present disclosure, in specific use, the knob 4 is first rotated to turn on, the knob 4 is turned to a required temperature, then the PTC heating sheet 8 may start continuous heating, and the temperature sensing probe 7 may monitor a temperature change in real time. The PTC heating sheet 8 may perform heating in a constant-temperature intermittent heating manner when the temperature reaches a set value, so that the temperature is maintained at the set value to achieve a constant-temperature effect. Temperature adjustment can be performed at any time by means of the knob 4 when the temperature is inappropriate. By providing the spacing bracket 5, the spacing bracket 5 separates the heating aluminum pot 6 from the PTC heating sheet 8 in an enclosing manner to prevent a high temperature produced in the wax melting process from directly baking the electronic control circuit board 3 and the upper shell 2, so that components and parts on the circuit board can be prevented from premature aging or desoldering caused by long-term tolerance to the high temperature, the stability of a control circuit can be improved, the service life of the product can be prolonged, and an operator can be prevented from being scalded by the housing 100 being continuously heated, which can greatly improve the stability and safety of the product. The PTC heating sheet 8 and the temperature sensing probe 7 are fixedly mounted by means of the fixing bracket 9, and the PTC heating sheet 8 and the temperature sensing probe 7 are propped against the bottom of the heating aluminum pot 6, so that the PTC heating sheet 8 and the temperature sensing probe 7 may be in more stable contact with the heating aluminum pot 6, the heating aluminum pot 6 can be heated more stably, and the accuracy in monitoring a wax melting temperature by the temperature sensing probe 7 can be improved. By providing the aluminum-pot pressing blocks 14 around the heating aluminum pot 6 and tightly pressing the aluminum-pot pressing blocks 14 against the edge of the heating aluminum pot 6, the aluminum-pot pressing blocks 14 can fasten the heating aluminum pot 6 in place without deforming the heating aluminum pot 6.

It should be noted that, in this context, relational terms such as first and second are used merely to distinguish one entity or operation from another entity or operation, and do not necessarily require or imply any actual relationship or order between these entities or operations. In addition, the term "including", "include" or any other variants thereof is intended to cover a non-exclusive inclusion, such that a process, method, article or apparatus that includes a series of elements includes not only those elements but also other elements that are not specifically listed, or further includes elements that are inherent to such a process, method, article or apparatus.

The above descriptions are merely preferred embodiments of the present disclosure and are not intended to limit the present disclosure in any form. Although the preferred embodiments of the present disclosure have been disclosed above, they are not intended to limit the present disclosure, and any person skilled in the art that is familiar with this patent without departing from the scope of the technical solution of the present disclosure.

The invention claimed is:

1. A wax melting device, comprising:

a housing;

a heating aluminum pot arranged in the housing;

a spacing bracket, the spacing bracket being arranged in a cavity between the housing and the heating aluminum pot and enclosing at least a part of the heating aluminum pot; and at least two aluminum-pot pressing blocks, the aluminum-pot pressing blocks being arranged at different positions of the heating aluminum pot, at least one face of each of the aluminum-pot pressing blocks abutting against the heating aluminum pot, and the aluminum-pot pressing blocks being also in contact with the housing.

2. The wax melting device according to claim 1, wherein the aluminum-pot pressing blocks are in contact with an edge of the heating aluminum pot to fix the heating aluminum pot such that the heating aluminum pot is not prone to looseness after long-term heating.

3. The wax melting device according to claim 1, further comprising: a wax melting silicone bowl, the wax melting silicone bowl being arranged on an inner surface of the heating aluminum pot.

4. The wax melting device according to claim 3, wherein a bowl rim is provided at an upper end of the wax melting silicone bowl, and a hand-held member is provided at a side edge of the bowl rim.

5. The wax melting device according to claim 3, wherein scale lines are provided on an inner surface of the wax melting silicone bowl.

6. The wax melting device according to claim 3, wherein the wax melting silicone bowl is also movably connected to a top cover, and the top cover is provided with a handle.

7. The wax melting device according to claim 1, wherein the housing comprises an upper shell and a lower shell, an electronic control circuit board is arranged between the upper shell and the spacing bracket, and the electronic control circuit board is connected to the upper shell.

8. The wax melting device according to claim 7, wherein the electronic control circuit board comprises a control panel, a switch torsion bar and a digital display screen, the digital display screen being electrically connected to the control panel, and the digital display screen being arranged in a viewing window formed in the upper shell.

9. The wax melting device according to claim 8, wherein the switch torsion bar passes through the upper shell and extends to the outside of the upper shell, and a knob is provided at an end portion of the switch torsion bar.

10. The wax melting device according to claim 7, wherein a locating column is provided on an inner side of the lower shell, the spacing bracket is provided with a bolt column, and the bolt column is embedded into the locating column to connect the spacing bracket to the lower shell.

11. A wax melting device, comprising:

a housing;

a heating aluminum pot arranged in the housing;

a spacing bracket, the spacing bracket being arranged in a cavity between the housing and the heating aluminum pot and enclosing a part of the heating aluminum pot; and a fixing bracket, the fixing bracket being arranged inside the housing, located at a lower end of the spacing bracket and connected to a bottom of the spacing bracket;

wherein the fixing bracket is provided with a groove for mounting a temperature sensing probe and a locating slot for placing a PTC heating sheet, the fixing bracket is arranged at a bottom of the heating aluminum pot, and the temperature sensing probe and the PTC heating sheet are arranged between the fixing bracket and the heating aluminum pot and are in direct contact with the heating aluminum pot.

12. The wax melting device according to claim 11, wherein the spacing bracket is of a hollow cylindrical structure, and a bottom of the cylindrical structure is connected to the fixing bracket.

13. The wax melting device according to claim 11, wherein the temperature sensing probe and the PTC heating sheet are electrically connected to an electronic control circuit board, and the electronic control circuit board is connected to a power cord on a rear side of the housing.

14. The wax melting device according to claim 11, comprising at least two aluminum-pot pressing blocks, the aluminum-pot pressing blocks being arranged at different positions of the heating aluminum pot, at least one face of each of the aluminum-pot pressing blocks abutting against the heating aluminum pot, and the aluminum-pot pressing blocks being also in contact with the housing.

15. The wax melting device according to claim 14, wherein the aluminum-pot pressing blocks are in contact with an edge of the heating aluminum pot to fix the heating aluminum pot such that the heating aluminum pot is not prone to looseness after long-term heating.

16. The wax melting device according to claim 11, further comprising: a wax melting silicone bowl, the wax melting silicone bowl being arranged on an inner surface of the heating aluminum pot.

17. The wax melting device according to claim 11, wherein the housing comprises an upper shell and a lower shell, an electronic control circuit board is arranged between the upper shell and the spacing bracket, and the electronic control circuit board is connected to the upper shell; and a locating column is provided on an inner side of the lower shell, the spacing bracket is provided with a bolt column, and the bolt column is embedded into the locating column to connect the spacing bracket to the lower shell.

* * * * *